United States Patent Office 3,105,092
Patented Sept. 24, 1963

3,105,092
PURIFICATION OF BETA-ALANINE
Fedor Poppelsdorf, Charleston, W. Va., assignor to Union Carbide Corporation, a corporation of New York
No Drawing. Filed Sept. 25, 1959, Ser. No. 842,210
7 Claims. (Cl. 260—534)

This invention relates, in general, to a novel method for the purification of beta-amino-acids. In one aspect, this invention relates to a novel method for the purification of beta-aminopropionic acid, more commonly known as beta-alanine.

With the increased use of the vitamin B complex group, particularly in animal feed diets, the synthesis of beta-alanine as an intermediate in the preparation of pantothenic acid, has received considerably more attention in recent years. Because of the importance of beta-alanine in the synthesis of pantothenic acid, a member of the B complex group, considerable time and effort have been spent in an attempt to prepare this compound by the most practical and economical method. Several inexpensive commercial processes for the manufacture of beta-alanine have been proposed which are both economical, efficient and produce the product in relatively high yields. Of the several known processes, one of the more promising methods involves the interaction at elevated temperatures and pressures of aqueous ammonia and acrylonitrile:

$$CH_2=CHCN + NH_3 + H_2O \rightarrow NH_2CH_2CH_2CO_2H$$

to produce a product which can be easily isolated. Other processes have been devised wherein aqueous ammonia has been reacted with acrylate esters to give beta-alanine and an alcohol:

$$CH_2=CHCO_2R + NH_3 + H_2O \rightarrow NH_2CH_2CH_2CO_2H + ROH$$

Each of the foregoing syntheses has generally been carried out at temperatures within the range of from 125° C.–250° C. However, for a variety of reasons, these methods produce impure beta-alanine which is contaminated principally by 3,3′-iminodipropionic acid and/or its monoammonium salt. Consequently, the practical processes heretofore proposed for the synthesis of beta-alanine necessitate, in each case, a purification step to remove these impurities. Since the physical and chemical properties of the 3,3′-iminodipropionic acid and its monoammonium salt are very closely related to those of beta-alanine, the more common purification techniques, such as crystallization or sublimation, are either impractical or too expensive for large scale operation.

Accordingly, one or more of the following objects will be achieved by the practice of the instant invention. It is an object of the present invention to provide a simple and practical procedure for the purification of crude beta-amino-acids. A further object is to provide a process for the purification of crude beta-alanine. It is another object of the present invention to provide a process for the purification of crude beta-alanine produced by the interaction of ethylene cyanohydrin and aqueous ammonia. A further object is to provide a process for the purification of crude beta-alanine produced by the interaction of acrylate esters and aqueous ammonia. A still further object of the present invention is to provide a purification process wherein beta-alanine is obtained which has a purity as high as 99.9 percent. Another object is to provide a process for the purification of beta-alanine which is inexpensive and practical to operate. A further object of the present invention is to provide a process for the purification of beta-alanine which does not involve the addition of any inorganic materials. A still further object of the present invention is to provide a process for the purification of beta-alanine wherein the residue from the reaction can be recycled to give further quantities of beta-alanine. These and other objects will readily become apparent to those skilled in the art in the light of the teachings herein set forth.

A broad aspect of this invention is directed to a process for the purification of a crude beta-amino-acid which comprises the steps of: refluxing an aqueous solution containing the crude beta-amino-acid in the presence of a compound which is a member selected from the group consisting of secondary and tertiary amines having the respective formulae:

and

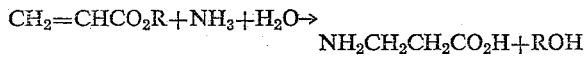

wherein R is an alkyl radical containing from 1 to 6 carbon atoms and R′ is an alkyl radical branched in a position alpha to the nitrogen atom and containing from 3 to 6 carbon atoms; evaporating said solution to a syrupy concentrate; precipitating the beta-amino-acid from said concentrate by the addition of a water-miscible alcohol; and thereafter recovering and drying the purified beta-amino-acid.

The reported processes for the preparation of beta-alanine by the reaction of aqueous ammonia and either ethylene cyanohydrin or acrylate esters involve heating the reactants under pressure at an elevated temperature and subsequently evaporating the product almost to dryness. By treating the liquid residue with a suitable solvent such as, for example, anhydrous methanol, the beta-alanine precipitates from solution. Since these syntheses are generally carried out at temperatures between about 125° C. to 250° C., it is highly probable that within this range the following equilibrium exists:

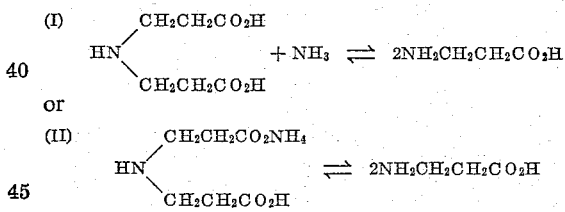

Consequently, a practical method for the purification of beta-alanine requires a method which will eliminate the 3,3′-iminodipropionic acid and its monoammonium salt as represented respectively by compounds (I) and (II). As previously indicated, the similarity of the physical and chemical properties of the impurities and the beta-alanine renders the more common purification techniques inoperative from an economic viewpoint. A critical analytical investigation of beta-alanine prepared by the aforementioned syntheses indicated that the major impurity was probably the monoammonium salt of 3,3′-iminodipropionic acid (II). While this salt can be removed from the beta-alanine by fractional crystallization from alcohol-water mixtures this technique is impractical for large scale operation.

The present invention is therefore based, in part, upon the discovery that beta-alanine having a purity of from about 96 to about 99.9 percent can easily be obtained by the sequence of steps noted above. One of the major improvements of this invention was to make the preliminary isolation of crude beta-alanine unnecessary. Thus, the crude mixture from the amination reaction can be decolorized with charcoal, filtered and evaporated at reduced pressure below 60° C. to a syrupy concentrate. A suitable amine, hereinafter described, can then be added directly to the crude product and the mixture refluxed with stirring for a period of from about 0.17 to about 8 hours. Thereafter, the amine is distilled off as rapidly as possible at atmospheric pressure and the residue diluted with water. The solution is again decolorized with charcoal, filtered and evaporated almost to dryness at a reduced pressure of from about 10 to about 200 millimeters of mercury. Upon the addition of anhydrous methanol to the mixture and stirring at room temperatures, the precipitation of the beta-alanine is complete. The quantity of anhydrous methanol necessary to effect precipitation need only be a precipitating amount sufficient to completely precipitate substantially all the beta-alanine present in the concentrate. The product is then washed twice with anhydrous methanol, and dried under a reduced pressure of about 5 to about 500 millimeters of mercury. Other water-miscible alcohols can also be used for the precipitation step, for example, ethanol, 1-propanol, 2-propanol, 1-butanol, 2-butanol, iso-butanol, tertiary butanol and the like. The beta-alanine obtained by this process has a purity of from about 96 to about 98 percent. A typical analysis of beta-alanine purified by the aforesaid method is as follows:

Ammonia _____ Trace
Purity (by perchloric acid titration) _____ 96.6%
Purity (from a total acidity determination) ____ 98.4%
Melting point _____ 195–197° C.

This is in contrast to a purity of from about 40 to about 80 percent for the crude beta-alanine obtained directly from the amination reaction.

A unique advantage of the process of the present invention is that the residues from the reaction can be recycled to the reaction vessel to give further quantities of beta-alanine. Inasmuch as no inorganic or foreign ions have been introduced into the reaction product, recycling of the residue can easily be accomplished with no adverse effect on the starting materials or the reaction itself. In actual practice, by recycling the residue, the overall yield of beta-alanine based upon the ethylene cyanohydrin or acrylate esters can be increased to as high as 85 percent. An additional feature of the present invention which makes this process suitable for large scale operation is that no special equipment or apparatus is needed and the amine utilized in the purification step can be recovered and used for further purification.

Certain precautions must be taken in the choice of amine employed in the purification step as described above. In practice it has been found that the best results are obtained by using amines which are members selected from the group consisting of secondary and tertiary amines having the respective formulae:

and

wherein R is an alkyl radical containing from 1 to 6 carbon atoms and R' is an alkyl radical branched in a position alpha to the nitrogen atom and containing from 3 to 6 carbon atoms. Particularly preferred amines are those represented by the above formulae wherein R and R' each contain a maximum of 4 carbon atoms. The amines should also possess the following characteristics:

(a) The amine should preferably have a basic dissociation constant ($K_b$) greater than that of ammonia (i.e. greater than $1.74 \times 10^{-5}$) in order to displace it from the ammonium salt as rapidly and as efficiently as possible.

(b) The amine should preferably be appreciably soluble in water within the temperature range of from about 30° C. to about 150° C.

(c) The amine should preferably not combine by 1:4-addition with either acrylic acid or acrylate esters.

(d) The amine should preferably have a molecular weight large enough to form a methanol-soluble salt of 3,3'-iminodipropionic acid.

(e) The amine should preferably form a methanol soluble salt with acrylic acid.

(f) The amine should preferably have a boiling point between from about 30° C. to about 215° C. so that purification can be accomplished at ordinary pressures and so that the amine can readily be removed when the reaction is completed.

Preferred secondary and tertiary amines which fulfill the above requirements and which are readily available include, among others, triethylamine and diisopropylamine. Diisopropylamine is preferred due to the fact that it is a stronger base and has a greater water solubility than triethylamine. Additionally, since diisopropylamine and ethyl acrylate are known not to react, it is highly unlikely that the amine would add across the double bond of acrylic acid due to the similarity of steric factors.

Illustrative of other amines which can also be employed in the practice of the present invention are the following: N-tertiarybutylmethylamine, tripropylamine, tributylamine, N,N-dimethylbutylamine, N,N-dimethylamylamine, N,N-dimethylethylamine, N,N-dimethylpropylamine, N,N-diethylpropylamine, N,N-diethylbutylamine, N,N-dipropylbutylamine, and the like. While amines possessing the aforementioned characteristics are preferred, other secondary and tertiary amines having a boiling point within the temperature range of from about 30° C. to about 215° C. will aid in removing the impurities. However, the secondary amines are preferably limited to those compounds which by reason of steric factors will not combine, by 1,4-addition, with acrylic acid or acrylate esters. At least one of the alkyl groups of the secondary amine should be branched at the carbon atom in the alpha position to the nitrogen atom and preferably have a total of at least three carbon atoms.

The quantity of amine which can be added is not necessarily critical and all that is needed is an amount sufficient for complete conversion of substantially all of the impurities into methanol-soluble amine salts. This amount will vary from about 0.59 to about 1.97 moles of amine per mole of the organic starting material (i.e. ethylene cyanohydrin or acrylate ester). Preferably, however, from about 0.59 to about 0.99 moles of amine per mole of organic starting material is sufficient while from about 0.74 to about 0.84 mole is the most preferred range. Concentrations above and below these amounts can equally as well be employed but are less preferred.

In practice, it has been observed that beta-alanine decomposes to an extent of about eleven per cent after prolonged refluxing (five hours) with an excess of aqueous amine. Upon decomposition the acrylic acid liberated usually polymerizes with resulting purification difficulties. While in actual operation the refluxing is effected for only one and one-half hours, it has been found desirable, although not absolutely necessary, to add a polymerization inhibitor to the reaction mixture. Suitable inhibitors include the common free-radical polymerization inhibitors such as hydroquinone, 4-methoxyphenol, and the like. A particular preferred inhibitor is phenothiazine. The quantity of inhibitor employed need only be an inhibiting amount sufficient to inhibit any acrylic acid formed in the mixture from polymerizing. In practice it has been found desirable to add from about 0.01 to about 1.0 percent by weight of inhibitor of the reaction mixture or more preferably approximately 0.2 percent of phenothiazine by weight of the reaction mixture.

The refluxing operation of the present invention should be maintained for a period of time sufficient to allow complete conversion of the monoammonium salt of 3,3'-iminodipropionic acid into the diisopropylamine salt, and at the same time avoid prolonged refluxing which can cause appreciable decomposition of the amino-acid. In practice a reflux time of from about 0.17 to about 8.0 hours has been found suitable. A preferred reflux time is from about 0.17 to about 5.0 hours and still more preferably from about 1.5 to about 3 hours. Reflux times shorter or longer than the aforementioned periods can also be employed but are less desirable.

In another aspect of the present invention the recovery and drying step can include recrystallizing the purified beta-alanine from an aqueous saturated solution of beta-alanine to give a product of a high degree of purity especially suited for pharmaceutical uses. A typical sample of beta-alanine having a purity of from about 94 to about 96 percent was dissolved in hot aqueous solution of beta-alanine which had been saturated at room temperature with the amino acid. The solution, on being cooled to room temperature gave almost pure beta-alanine in a yield of 89 percent and having the following analysis:

| | |
|---|---|
| Loss on drying | 0.08 after 8 hours. |
| Residue on ignition | Nil. |
| Chlorides | Less than 0.02%. |
| Sulfates | Less than 0.05%. |
| Ammonia | Less than 0.1%. |
| Heavy metals | Less than 0.003%. |
| Iron | Less than 0.005%. |
| Purity (by perchloric acid titration) | 99.9%. |
| Color | White. |
| Odor | Odorless. |
| Form | Granular crystals. |
| Appearance | Clean, free from contamination. |
| Melting and solubility characteristics | Melts rather than sublimes. Soluble in acetic acid. |
| Water | 0.40% by weight. |
| Melting point | 199–201° C. |

The melting point of pure beta-alanine is 200° C.–202° C.

While the synthesis of beta-alanine has been illustrated by only two processes as hereinbefore indicated, the method of purification of the present invention is applicable to any process for the preparation of beta-alanine wherein the impurities previously mentioned are likely to occur. Thus, for example, the purification process can equally as well be employed for beta-alanine prepared by the interaction of beta-propiolactone and ammonia, acrylonitrile and aqueous ammonia, hydroacrylic acid and aqueous ammonia, and the like.

The following examples illustrate the present invention:

*Example I*

153 cubic centimeters of ethyl acrylate (141.4 grams; 1.415 moles), 420 cubic centimeters of aqueous 28 percent ammonia (4.4×1.415 moles), 830 cubic centimeters of water and 0.142 gram of phenothiazine were charged to a stainless steel autoclave equipped with a rocking device and heated for eight hours at 190° C. at an average pressure of 280 pounds per square inch gauge. After cooling the reaction mixture was treated with 10 grams of charcoal (Norit A, produced by the American Norit Co.) and evaporated at reduced pressure and at a temperature below 60° C. to a volume of 300 cubic centimeters. The solution was again treated with 10 grams of charcoal and evaporated almost to dryness under reduced pressure. 200 cubic centimeters of anhydrous methanol were added to the residual syrup and the mixture stirred at room temperature until precipitation of the solid was complete. The crude beta-alanine was collected, washed twice with 50 cubic centimeter portions of anhydrous methanol and dried at 60° C. under reduced pressure. A yield of 58.5 grams of colorless crystals was obtained having a melting point of from 133° C. to 147° C. This product contained 1.68 percent by weight of combined ammonia and 75 percent by weight of beta-alanine.

15 grams of this crude product were dissolved in 100 cubic centimeters of water. 56 cubic centimeters of diisopropylamine (40.2 grams) were added and the mixture refluxed with stirring for 1.5 hours. The excess of the amine was distilled off under reduced pressure and the residue dissolved in 20 cubic centimeters of water and then treated with 3.5 grams of charcoal. Evaporation of the filtrate under reduced pressure gave an almost colorless syrup. 50 cubic centimeters of anhydrous methanol were added and the mixture stirred at room temperature for 16 hours. The precipitated solid was collected, washed twice with 10 cubic centimeter portions of anhydrous methanol and dried at 60° C. under reduced pressure. 8.77 grams of beta-alanine were obtained having a purity of 97 percent and a melting point of 196° C. to 198° C.

*Example II*

68 cubic centimeters of ethylene cyanohydrin (71.1 grams; 1 mole), 345.0 cubic centimeters of aqueous 28 percent ammonia (5.0 moles) and 501 cubic centimeters of water were charged to a 3-liter stainless steel autoclave equipped with a rocking device. This mixture was heated and rocked for 8 hours at 190° C. at an average pressure of 285 pounds per square inch gauge. After cooling, the reaction mixture was treated with 10 grams of charcoal (Norit A), filtered, and the filtrate evaporated almost to dryness under reduced pressure and at a temperature below 60° C. The residual syrup was stirred with 106 cubic centimeters of anhydrous methanol for about 16 hours at room temperature. The precipitated solid was collected, washed twice with 20 cubic centimeter portions of anhydrous methanol and dried under reduced pressure and at a temperature below 60° C. A yield of 45.8 grams of a faintly pink solid was obtained having a melting point of from 114° C. to 144° C. This solid was impure beta-alanine and contained 1.96 percent by weight of combined ammonia and 78.1 percent by weight of beta-alanine.

15 grams of this crude product were dissolved in 100 cubic centimeters of water. 56 cubic centimeters of diisopropylamine (40.2 grams) were then added and the mixture refluxed with stirring for 1.5 hours. The excess of the amine was distilled off under reduced pressure and the residue dissolved in 20 cubic centimeters of water and then treated with 3.5 grams of charcoal and filtered. Evaporation of the filtrate under reduced pressure gave an almost colorless syrup. 50 cubic centimeters of anhydrous methanol were added and the mixture stirred at room temperature for 16 hours. The precipitated solid was collected, washed twice with 10 cubic centimeter portions of anhydrous methanol and dried at 60° C. under reduced pressure. 9.00 grams of beta-alanine were obtained having a purity of 95 percent and a melting point of 192° C. to 195° C.

*Example III*

153 cubic centimeters of ethyl acrylate (141.4 grams; 1.415 moles), 420 cubic centimeters of aqueous 28 percent ammonia (4.4×1.415 moles), 830 cubic centimeters of water, and 0.142 gram of phenothiazine were charged to a 3-liter stainless steel autoclave fitted with a rocking device. This mixture was heated and rocked for 17 hours at a pressure of 75 pounds per square inch gauge and an average temperature of 127° C. After cooling, the reaction mixture was treated with 10.0 grams of charcoal (Norit A, produced by the American Norit Co.) and evaporated at reduced pressure at a temperature below 60° C. to a volume of 300 cubic centimeters. 156 cubic centimeters of diisopropylamine (112 grams) and 0.1 gram of phenothiazine were added and the mixture refluxed with stirring for 1.5 hours. At the end of this time the amine was distilled off at atmospheric pressure as rapidly as possible and the residue diluted with 50 cubic centimeters of distilled water. The solution was treated with 10 grams of charcoal and thereafter evaporated almost to dryness under reduced pressure. 150 cubic centimeters of anhydrous methanol was added to the residue and the mixture stirred at room temperature until precipitation of the beta-alanine was completed (approximately 15 hours). The beta-alanine was collected, washed twice with 30 to 35 cubic centimeter portions of anhydrous methanol and dried at 60° C. under reduced pressure. A yield of from 43 to 48 grams of colorless crystals of beta-alanine was obtained which represented 34 to 38 percent of the theoretical. This product had a purity of 96 to 98 percent and a melting point of 194° C. to 196° C.

The slightly impure beta-alanine was then dissolved in a hot aqueous solution previously prepared by saturating water at room temperature with beta-alanine. Material having a purity of from 94 to 96 percent is suitable for this purpose. The solution was then cooled to room temperature with gentle stirring, kept at this temperature for three hours and the separated crystals collected and dried at 60° C. under reduced pressure. A yield of from 38 to 43 grams of beta-alanine was obtained which represented 30 to 34 per cent of the theoretical. This product had a purity of 99.9 percent and a melting point of 199° C. to 201° C.

Although the invention has been illustrated by the preceding examples, the invention is not to be construed as limited to the materials employed in the above examples, but rather, the invention encompasses the generic area as hereinbefore disclosed. Various modifications and embodiments of this invention can be made without departing from the spirit and scope thereof.

What is claimed is:

1. A process for the purification of impure beta-alanine which contains impurities of the group consisting of 3,3'-iminodipropionic acid, 3,3'-iminodipropionic acid mono-ammonium salt and mixtures thereof, which process comprises contacting, at reflux, the impure beta-alanine with aqueous alkyl amine of the group consisting of secondary and tertiary amines of the respective formulas

and

wherein R is an alkyl of 1 to 6 carbons and R' is an alkyl branched in a position alpha to the nitrogen atom and of 3 to 6 carbons, in an amount and for a period of time sufficient to convert the 3,3'-iminodipropionic acid and 3,3'-iminodipropionic acid mono-ammonium salt to methanol-soluble alkylamine salts; evaporating the solution to a syrupy concentrate; precipitating beta-alanine from the syrupy concentrate by addition of water-miscible alkanol and separating the precipitated beta-alanine of decreased 3,3'-iminodipropionic acid and 3,3'-iminodipropionic acid mono-ammonium salt content.

2. A process as claimed in claim 1 wherein the amine is diisopropylamine.

3. A process as claimed in claim 1 wherein the amine is triethylamine.

4. The process according to claim 1, wherein said amine has a boiling point within the temperature range from about 30° C. to about 215° C.

5. The process according to claim 1, wherein the water-miscible alkanol is substantially anhydrous methanol.

6. The process according to claim 1, wherein said solution of impure beta-alanine and alkyl amine is refluxed for a period of time ranging from about one hour to about 5 hours, sufficient to convert substantially all the 3,3'-iminodipropionic acid and the 3,3'-iminodipropionic acid monoammonium salt to the corresponding amine salts which are soluble in water miscible alkanols.

7. A process for the purification of impure beta-alanine which contains impurities of the group consisting of 3,3'-iminodipropionic acid, 3,3'-iminodipropionic acid mono-ammonium salt and mixtures thereof, which process comprises contacting the impure beta-alanine with aqueous diisopropylamine at reflux for 0.17 hours to 5 hours in an amount sufficient to convert the 3,3'-iminodipropionic acid and 3,3'-iminodipropionic acid mono-ammonium salt to the methanol soluble diisopropylamine salt; evaporating the solution to a syrupy concentrate; precipitating beta-alanine from the syrupy concentrate by addition of methanol and separating the precipitated beta-alanine of decreased 3,3'-iminodipropionic acid and 3,3'-iminodipropionic acid mono-ammonium salt content.

References Cited in the file of this patent

UNITED STATES PATENTS 2,461,842   Olin _____ Feb. 15, 1949